United States Patent [19]

Morii et al.

[11] Patent Number: 5,400,195
[45] Date of Patent: Mar. 21, 1995

[54] MAGNETIC DISK APPARATUS WITH FLEXIBLE PRINTED CIRCUIT ATTACHED TO HEAD CARRIAGE BY DOUBLE SIDED PRESSURE SENSITIVE TAPE

[75] Inventors: Kiyoko Morii; Masaki Jinbo; Takeshi Ohyama; Tsuneyori Ino; Tsuyoshi Furukawa, all of Kawasaki, Japan

[73] Assignee: Fujitsu Ltd., Japan

[21] Appl. No.: 62,582

[22] Filed: May 17, 1993

[51] Int. Cl.$^6$ .................................. G11B 33/14
[52] U.S. Cl. ........................ 360/97.01; 360/97.02
[58] Field of Search .............................. 360/104–106, 360/97.01, 97.02, 108

[56] References Cited

U.S. PATENT DOCUMENTS

| | | | |
|---|---|---|---|
| 4,408,238 | 10/1983 | Hearn | 360/104 |
| 4,760,478 | 7/1988 | Pal | 360/104 |
| 4,881,140 | 11/1989 | Ghose | 360/106 |
| 5,095,396 | 3/1992 | Putnam | 360/106 |
| 5,187,624 | 2/1993 | Shigemoto | 360/105 |
| 5,278,709 | 1/1994 | Thornton | 360/97.01 |

*Primary Examiner*—A. J. Heinz
*Attorney, Agent, or Firm*—Greer, Burns & Crain, Ltd.

[57] ABSTRACT

A magnetic disk apparatus including magnetic disks and a magnetic head assembly for access to the magnetic disks. The magnetic head assembly includes a head carriage having a hub and integral head arms, magnetic heads being carried by the head arms. A flexible printed circuit is attached to the side surface of the head carriage via a double sided pressure sensitive adhesive tape which provides a layer of elastomeric material to mitigate a deformation of the head carriage relative to the flexible printed circuit and the bearings supporting the head carriage to improve the off-track of the magnetic disks.

14 Claims, 6 Drawing Sheets

MAGNETIC DISK APPARATUS WITH FLEXIBLE PRINTED CIRCUIT ATTACHED TO HEAD CARRIAGE BY DOUBLE SIDED PRESSURE SENSITIVE TAPE

BACKGROUND OF THE INVENTION

1. Field of the Invention

The present invention relates to a magnetic disk apparatus used in a computer system and including a plurality of coaxially arranged magnetic disks and a magnetic head assembly, and in more specifically, the present invention relates to an improved magnetic head assembly having a flexible printed circuit attached to a head carriage by an adhesive.

2. Description of the Related Art

A magnetic disk apparatus comprises a plurality of coaxially arranged magnetic disks and a magnetic head assembly for cooperation with the magnetic disks. The magnetic head assembly comprises a head carriage with a hub and head arms extending from the hub in a line so that each of the head arms is inserted between two adjacent magnetic disks. Each of the head arms has at the free end thereof two spring arms, and a magnetic head is carried by each of the spring arms for access to the respective surfaces of the magnetic disks. The head carriage is rotatably supported by a shaft via bearings and rotationally actuated by a moving-coil-type motor so that the magnetic heads can move radially over the magnetic disks.

A flexible printed circuit is attached to the side surface of the head carriage for transferring electrical signals between the magnetic heads and a signal processing device. The flexible printed circuit comprises an electrical pattern sandwiched between the first and second insulating films, and electrical components such as integrated circuits (ICs), resisters and capacitors. These electrical components are arranged for each of the head arms. The electrical pattern includes a plurality of conductive lines extending along each of the head arms. Four conductive lines extend along each of the head arms for two inductive type magnetic heads, and eight conductive lines extend along each of the head arms for magneto-resistive type magnetic heads.

Conventionally, the flexible printed circuit is adhered to the head carriage by a thermosetting adhesive, typically, an epoxy adhesive, for firmly fixing the flexible printed circuit to the movable head carriage.

In recent computer systems, there is an increasing demand for a high storing capacity in the magnetic disks. To enhance the recording density in the magnetic disks, it is necessary to improve a positioning capability of the magnetic heads relative to the tracks on the magnetic heads. In an attempt to improve a positioning capability of the magnetic heads, it has found that there is an occurrence of a slight off-track of the moving magnetic heads, in particular, the uppermost and the lowermost magnetic heads, when the flexible printed circuit is adhered to the head carriage by a thermosetting adhesive.

SUMMARY OF THE INVENTION

The object of the present invention is to provide a magnetic disk apparatus including a plurality of coaxially arranged magnetic disks and a magnetic head assembly having a flexible printed circuit, by which an occurrence of an off-track in the moving magnetic heads is overcome.

According to the present invention, there is provided a magnetic disk apparatus comprising a plurality of coaxially arranged magnetic disks having respective opposite surfaces and a magnetic head assembly, the magnetic head assembly comprising a head carriage including a hub with an axis and a plurality of head arms extending from the hub in a line so that each of the head arms is inserted between two adjacent magnetic disks, the head carriage being rotatable about the axis of the hub, magnetic heads carried by the head arms for access to the respective surfaces of the magnetic disks, an actuator for rotationally actuating the head carriage so that the magnetic heads can move radially over the magnetic disks, signal transferring means for transferring electrical signals between the magnetic heads and a signal processing means, said signal transferring means including a flexible printed circuit attached to the head carriage, and a layer of elastomeric material arranged between the head carriage and the flexible printed circuit.

Off-track of the moving magnetic heads may be caused by a relative action of the flexible printed circuit and the head carriage like a bimetal, based on a difference of a coefficient of linear expansion between the flexible printed circuit and the head carriage, and between the hub of the carriage and the bearings inserted in the hub. According to the present invention an off-track of the moving magnetic heads is improved by the provision of the layer of elastomeric material, compared with the case in which the flexible printed circuit is attached to the head carriage by an epoxy adhesive. It is considered that the layer of elastomeric material may act as a cushioning layer mitigating a deformation of the head carriage affected by the flexible printed circuit.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
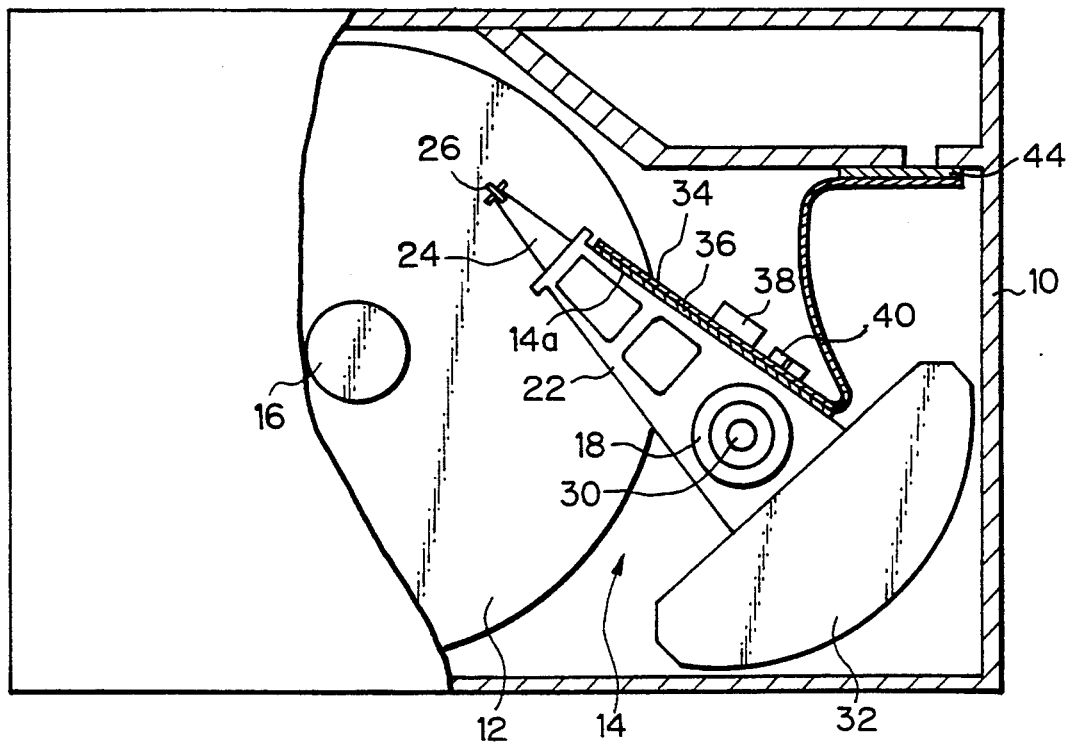
FIG. 1 is a top cross-sectional view of a magnetic disk apparatus according to the embodiment of the present invention.
Figure 2:
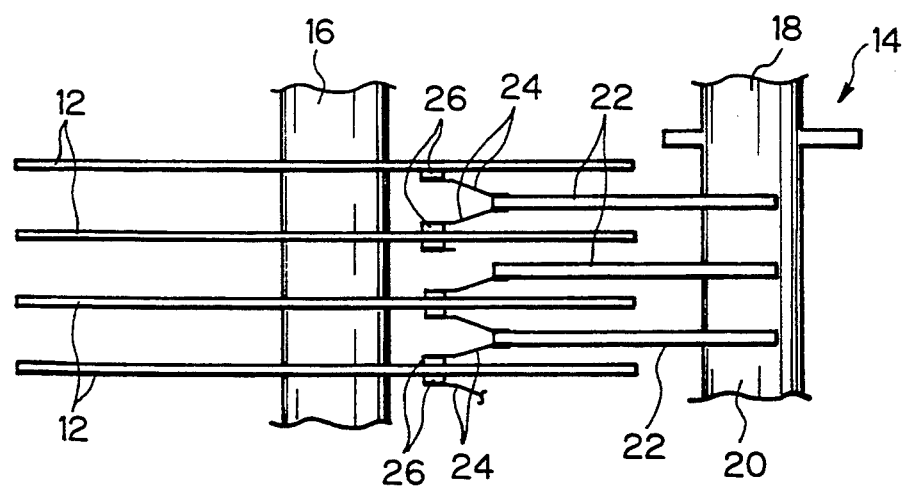
FIG. 2 is a side cross-sectional view of a part of the magnetic disk apparatus of FIG. 1.

Referring to FIGS. 1 and 2, the magnetic disk apparatus comprises an enclosure 10 which sealingly accommodates a plurality of magnetic disks 12 and a magnetic head assembly 14. The magnetic disks 12 are mounted to a spindle shaft 16 at constant intervals and the spindle shaft 16 is driven by a spindle motor (not shown).

The magnetic head assembly 14 comprises a head carriage 18 including a hub 20 and a plurality of head arms 22 integrally extending from the hub 20 in a line. As will be apparent, each of the head arms 22 are inserted between two adjacent magnetic disks 12. Each of the head arms 22 has at the free end thereof two spring arms 24, and a magnetic head 26 is carried by each of the spring arms 24 for access to the respective surfaces of the magnetic disks 12.

Figure 3:
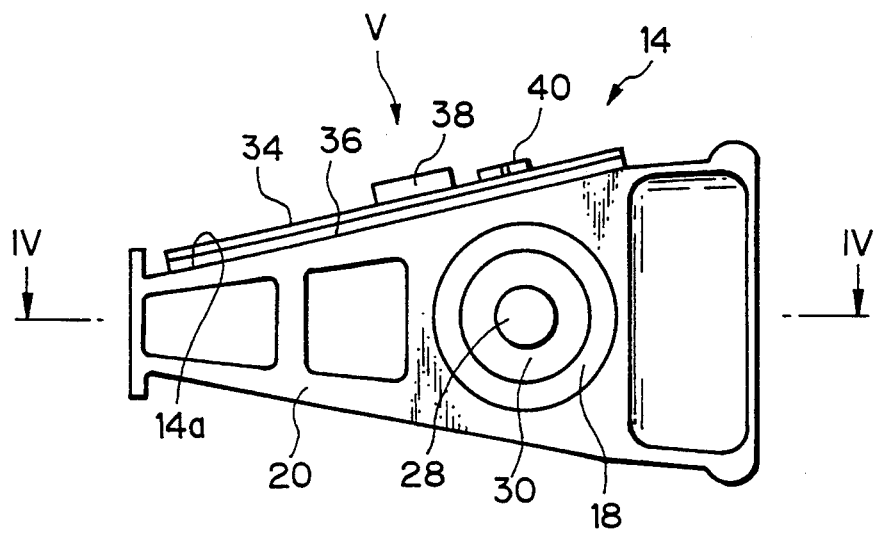
FIG. 3 is a plan view of the head carriage of FIG. 1.
Figure 4:
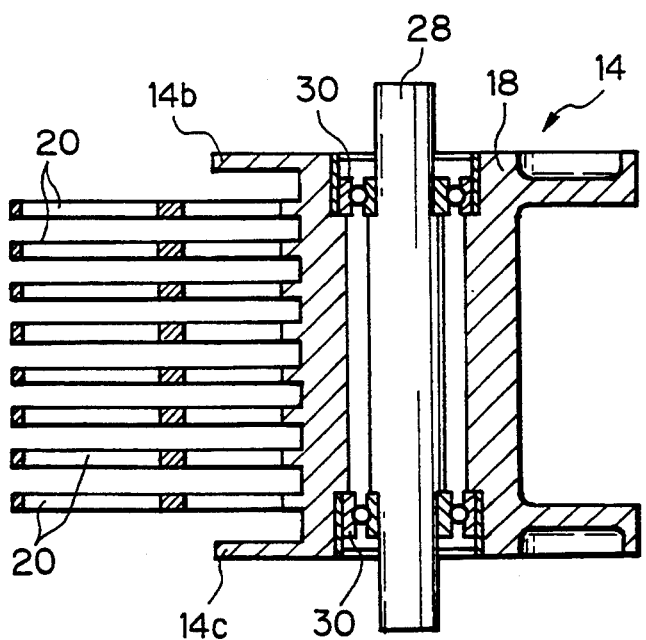
FIG. 4 is a cross-sectional view of the head carriage of FIG. 3, taken along the lines IV—IV of FIG. 3.

As shown in FIGS. 3 and 4, the hub 18 of the head carriage 18 is supported to a shaft 28 by two axially spaced bearings 30. As shown in FIG. 1, a moving coil type force motor 32 which includes a coil (not shown) connected to the head carriage 18 and a stationary magnet (not shown) is provided for rotationally actuating the head carriage 18 so that the magnetic heads 26 can move radially along the magnetic disks 12.

Figure 5:
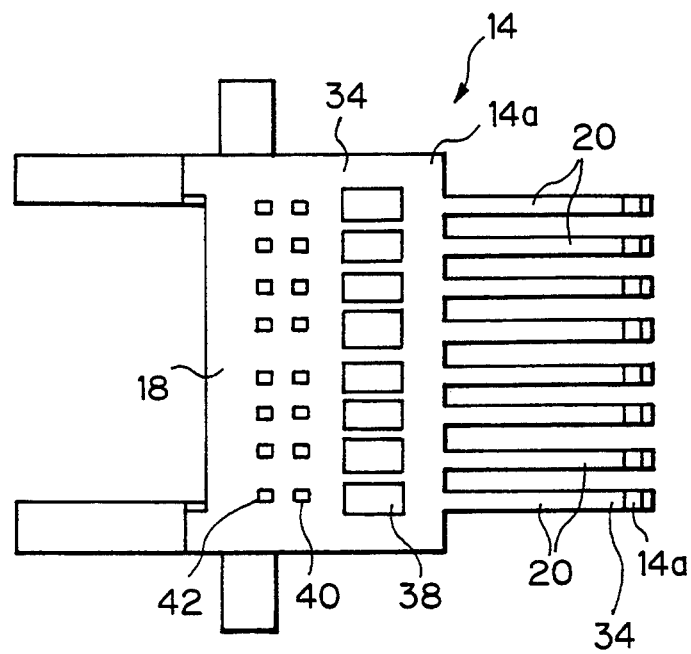
FIG. 5 is a side view of the head carriage of FIG. 3, viewed from the arrow V of FIG. 3.

As shown in FIGS. 1, 3 and 5, the head carriage 18 has a smooth, generally flat, side surface 14a which continuously extends from the hub 18 to the head arms 20. A flexible printed circuit 34 is attached to the side surface 14a of the head carriage 14 over the substantial portion of the hub 18 and the substantial portion of the head arms 20, by a double sided pressure sensitive adhesive tape 36 which provides a layer of elastomeric material. As shown in FIG. 1, the flexible printed circuit 34 comprises a first insulating film 34a, and a second insulating film 34b, and an electrical pattern 34c sandwiched between the first and second insulating films 34a and 34b. The insulating films 34a and 34b are formed from polyimide, for example.

Figure 6:
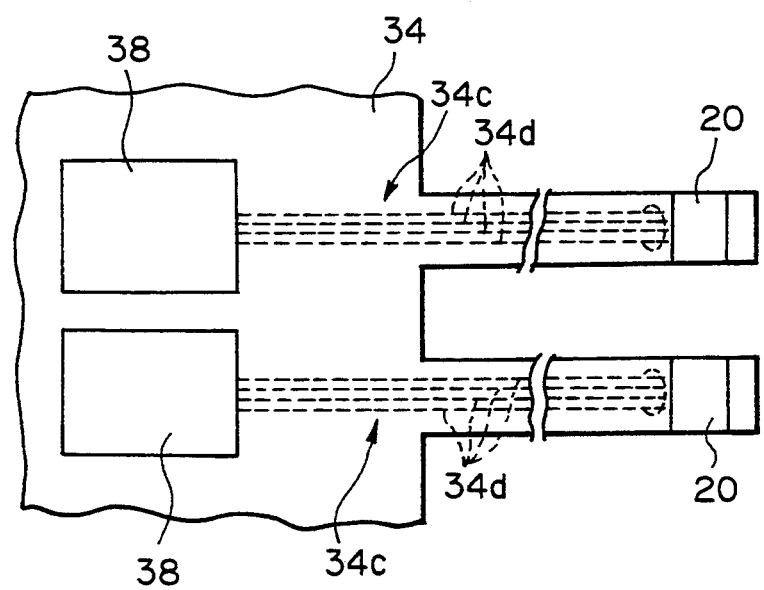
FIG. 6 is an enlarged view of the head carriage of FIG. 5.
Figure 7:
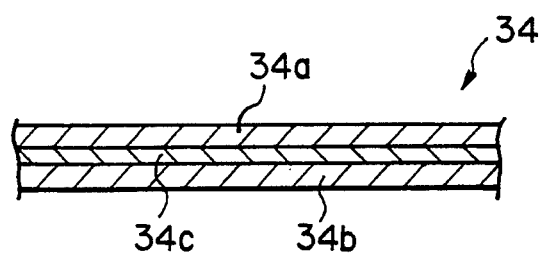
FIG. 7 is a cross-sectional view of the head carriage of FIG. 3.

The flexible printed circuit 34 is provided with electrical components such as integrated circuits (ICs) 38, resistors 40 and capacitors 42 which are located at a position on the hub 18 and arranged for each of the head arms 20. The electrical pattern 34c includes a plurality of conductive lines 34d extending along each of the head arms 20, as shown in FIG. 6. In the embodiment, four conductive lines 34d extend along each of the head arms 20 for two inductive type magnetic heads 26. If magneto-resistive type magnetic heads are used, eight conductive lines 34d may extend along each of the head arms 20. The flexible printed circuit 34 is connected to an intermediate printed circuit 44 by an extended portion of the flexible printed circuit 34, as shown in FIG. 1. The intermediate printed circuit 44 can be connected to a signal processing apparatus (not shown).

Figure 9:
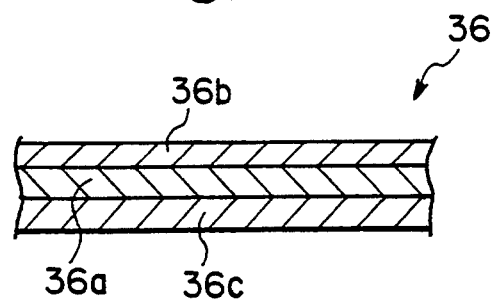
FIG. 9 is a cross-sectional view of the flexible printed circuit of FIG. 8.

The double sided pressure sensitive adhesive tape 36 comprises a carrier sheet 36a and two pressure sensitive adhesive layers 36a and 36c carried on either surface of the carrier sheet 36a, as shown in FIG. 9. If the carrier sheet 36a is made from elastomeric material, the carrier sheet 36a can provide a layer of elastomeric material. However, even if the carrier sheet 36a is made from paper, the pressure sensitive adhesive layers 36b and 36c have a relatively flexible property and can provide a layer of elastomeric material. The pressure sensitive adhesive layers 36b and 36c preferably comprises an acrylic adhesive having a relatively flexible property.

The preferably double sided pressure sensitive adhesive tape 36 is "CT-F-9460-3M" distributed by Sumitomo 3M in Japan, this having the thickness of 50 μm and including an acrylic adhesive.

Figure 8:
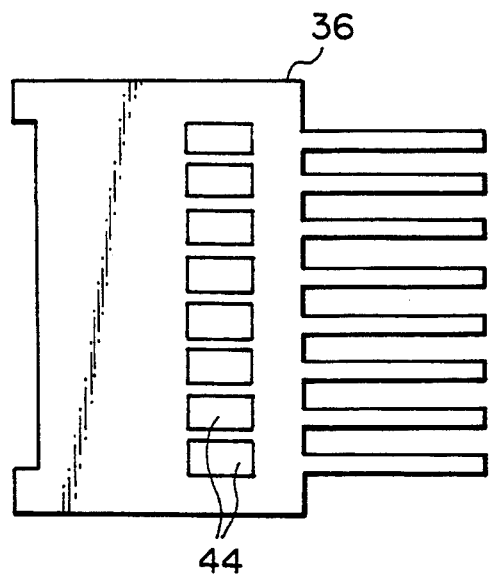
FIG. 8 is a plan view of the flexible printed circuit of FIG. 3.

The double sided pressure sensitive adhesive tape 36 is cut into a shape which fits with the flexible printed circuit 34, as can be seen from FIGS. 5 and 8. The double sided pressure sensitive adhesive tape 36 has holes 44, corresponding to the ICs 38 of the flexible printed circuit 34, to dissipate heat from the ICs 38. The head carriage 14 has top and bottom flanges 14b and 14c above and below the set of head arms 20, respectively, as shown in FIG. 4. The double sided pressure sensitive adhesive tape 36 and the flexible printed circuit 34 are shaped to cover the top and bottom flanges 14b and 14c, as shown in FIG. 5.

In the assembly work, the flexible printed circuit 34 is adhered to one side of the double sided pressure sensitive adhesive tape 36, and then the flexible printed circuit 34 with the double sided pressure sensitive adhesive tape 36 is pressed to the side surface 14a of the head carriage 14. Accordingly, the flexible printed circuit 34 is firmly adhered to the head carriage 14 via the flexible printed circuit 34.

In use, the environment temperature around the magnetic disk apparatus may vary, and components of the magnetic disk apparatus, especially, the head carriage 14, the flexible printed circuit 34 and the bearings 30 may expand or shrink according to the their coefficient of linear expansion. The flexible printed circuit 34 is made mainly from polyimide (the coefficient of linear expansion is $35 \times 10^{-6}$), the head carriage 14 is made from Magnesium (the coefficient of linear expansion is $26 \times 10^{-6}$) or Aluminum (the coefficient of linear expansion is $23 \times 10^{-6}$), and the bearings 30 are made from stainless steel (the coefficient of linear expansion is $12.5 \times 10^{-6}$).

Figure 10:
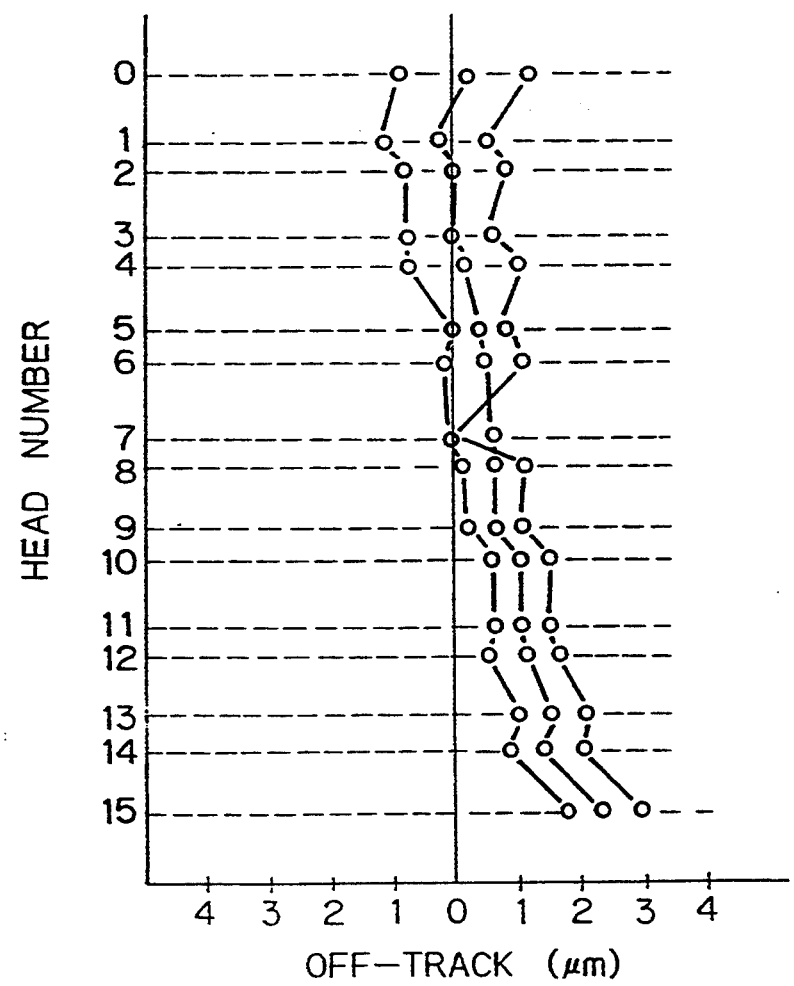
FIG. 10 is a graph illustrating the experimental result of the off-track in the prior art.
Figure 11:
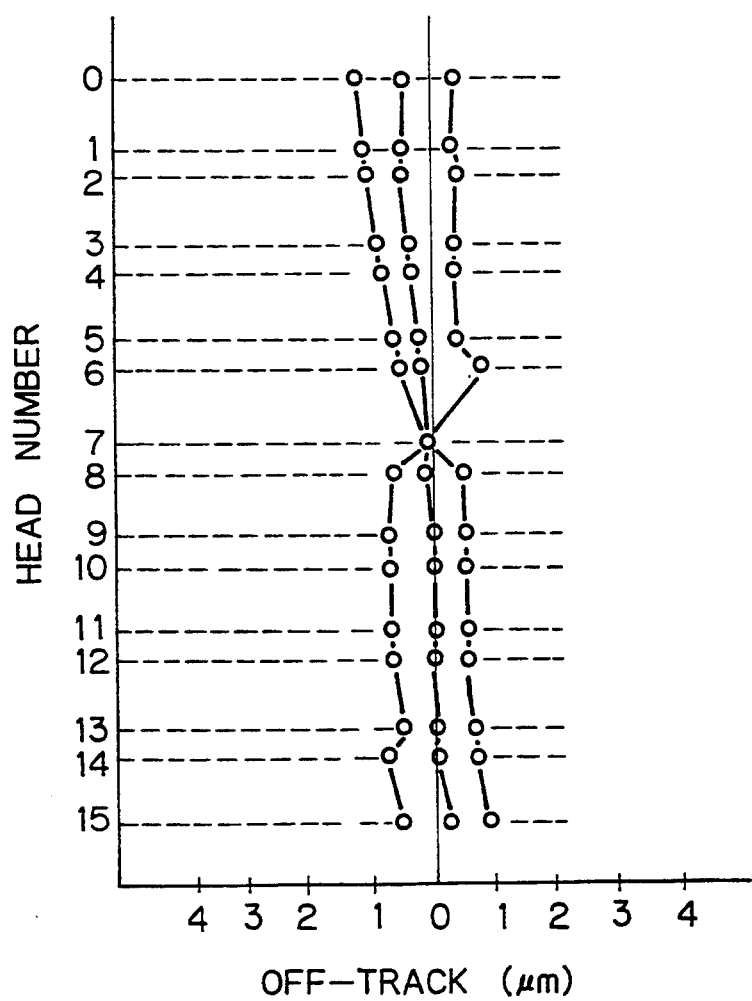
FIG. 11 is a graph illustrating the experimental result of the off-track according to the present invention.

FIG. 10 is a graph illustrating the experimental result of the off-track in the prior art which using a thermosetting epoxy adhesive to bond the flexible printed circuit 34 to the head carriage 14, and FIG. 11 is a graph illustrating the experimental result of the off-track according to the present invention using the double sided pressure sensitive adhesive tape 36. FIG. 10 shows that the off-track of the magnetic heads 26 is relatively large, and the off-track of the uppermost and the lowermost magnetic heads 26 is especially large, but FIG. 11 shows that the off-track of the magnetic heads 26 is relatively small.

The off-track of the magnetic heads 26 may be caused by a relative action of the flexible printed circuit 34 and the head carriage 14 like a bimetal, based on a difference of a coefficient of linear expansion between the flexible printed circuit 34 and the head carriage 14. From the result of FIG. 10, the off-track of the magnetic heads 26 may also be caused by a difference of a coefficient of linear expansion between the hub 18 of the carriage 14 and the bearings 30 because the off-track of the magnetic heads 26 is especially large regarding the uppermost and the lowermost magnetic heads 26 near which the bearings 30 are positioned.

As can be seen from FIG. 11, it has been found that the off-track of the magnetic heads 26 is improved by the provision of the layer of elastomeric material, in particular, the double sided pressure sensitive adhesive tape 36. It is considered that the layer of elastomeric material may act as a cushioning layer mitigating a deformation of the head carriage 14 affected by the flexible printed circuit 34 and the bearings 30, although the exact mechanism is not known.

We claim:

1. A magnetic disk apparatus comprising a plurality of coaxially arranged magnetic disks having respective opposite surfaces and a magnetic head assembly, the magnetic head assembly comprising:

a head carriage including a hub with an axis and a plurality of head arms extending from the hub in a line so that each of the head arms is inserted between two adjacent magnetic disks, the head carriage being rotatable about the axis of the hub;

magnetic heads carried by the head arms for access to the respective surfaces of the magnetic disks;

an actuator for rotationally actuating the head carriage so that the magnetic heads can move radially over the magnetic disks;

a flexible printed circuit attached to the head carriage; and a layer of elastomeric material arranged between and connected to both the head carriage and the flexible printed circuit.

2. A magnetic disk apparatus according to claim 1, wherein the head carriage has a smooth side surface continuously extending from the hub to the head arms, the flexible printed circuit being attached to the side surface of the head carriage over at least a portion of the hub and a portion of the head arms.

3. A magnetic disk apparatus according to claim 1, wherein the flexible printed circuit comprises a first insulating film, and a second insulating film, and an electrical pattern sandwiched between the first and second insulating films.

4. A magnetic disk apparatus according to claim 3, wherein the flexible printed circuit comprises at least one integrated circuit for each of the head arms.

5. A magnetic disk apparatus according to claim 4, wherein the at least one integrated circuit is located at a position on the hub, and the electrical pattern includes a plurality of conductive lines extending from the integrated circuit along the respective head arm.

6. A magnetic disk apparatus according to claim 5, wherein two magnetic heads are carried by each of the head arms.

7. A magnetic disk apparatus according to claim 1, wherein the layer of elastomeric material arranged between the head carriage and the flexible printed circuit comprises at least one layer of an adhesive having a relatively flexible property.

8. A magnetic disk apparatus according to claim 7, wherein the layer of elastomeric material comprises a pressure sensitive adhesive.

9. A magnetic disk apparatus according to claim 8, wherein the layer of elastomeric material comprises an acrylic adhesive having a relatively flexible property.

10. A magnetic disk apparatus according to claim 7, wherein the layer of elastomeric material comprises an acrylic adhesive having a relatively flexible property.

11. A magnetic disk apparatus according to claim 7, wherein the layer of elastomeric material comprises a pressure sensitive adhesive tape including a carrier sheet and at least one pressure sensitive adhesive layer carried by the carrier sheet.

12. A magnetic disk apparatus according to claim 11, wherein the layer of elastomeric material comprises a double sided pressure sensitive adhesive tape including a carrier sheet and two pressure sensitive adhesive layers carried by either surface of the carrier sheet.

13. A magnetic disk apparatus according to claim 1, wherein the layer of elastomeric material comprises a double sided pressure sensitive adhesive tape including a carrier sheet had two pressure sensitive adhesive layers carried on either surface of the carrier sheet.

14. A magnetic disk apparatus according to claim 13, wherein the adhesive layer comprises an acrylic adhesive having a relatively flexible property.

* * * * *